United States Patent
Ancona et al.

(10) Patent No.: US 6,698,338 B2
(45) Date of Patent: Mar. 2, 2004

(54) DOMESTIC MACHINE FOR MAKING, CUTTING AND SHAPING PASTA

(75) Inventors: Enrico Ancona, Turin (IT); Roberto Cheula, Turin (IT)

(73) Assignee: Imperia Trading S.r.l., Rome (IT)

( * ) Notice: Subject to any disclaimer, the term of this patent is extended or adjusted under 35 U.S.C. 154(b) by 0 days.

(21) Appl. No.: 10/204,343

(22) PCT Filed: Dec. 18, 2001

(86) PCT No.: PCT/IB01/02552
§ 371 (c)(1),
(2), (4) Date: Oct. 29, 2002

(87) PCT Pub. No.: WO02/49439
PCT Pub. Date: Jun. 27, 2002

(65) Prior Publication Data
US 2003/0150337 A1 Aug. 14, 2003

(30) Foreign Application Priority Data
Dec. 21, 2000 (IT) .................................... TO2000U0221

(51) Int. Cl.[7] ........................... A21C 3/04; A21C 11/16; B29B 1/06; B01F 7/18

(52) U.S. Cl. ........................ 99/450.2; 99/353; 99/492; 425/190; 425/204

(58) Field of Search ................. 99/337, 338, 352–355, 99/450.1–450.8, 492, 494; 366/98, 87, 99, 77, 309, 314, 319, 196; 425/190, 191, 194, 307, 204, 205, 294, 336, 185, 135, 367, 376.1, 363, 464, 466; 426/502, 504, 509, 516, 451, 557; D7/376, 368

(56) References Cited

U.S. PATENT DOCUMENTS

| | | | | |
|---|---|---|---|---|
| 4,057,377 A | * | 11/1977 | Sakurazawa | 425/135 |
| 4,083,668 A | * | 4/1978 | Bardwick et al. | 425/194 |
| 4,146,333 A | | 3/1979 | Zani | 366/99 |
| 4,360,332 A | * | 11/1982 | Cyin | 99/353 |
| 4,391,575 A | | 7/1983 | Osrow | 425/190 |
| 4,415,323 A | * | 11/1983 | Osrow et al. | 425/72.2 |
| 4,971,546 A | * | 11/1990 | Cimenti | 425/337 |
| 5,393,212 A | * | 2/1995 | Takano | 425/186 |
| 5,393,217 A | * | 2/1995 | Cheng | 99/348 |
| 5,401,159 A | * | 3/1995 | Hsu | 99/353 |
| 5,402,715 A | * | 4/1995 | Kurachi et al. | 99/450.2 |
| 5,409,365 A | * | 4/1995 | Su et al. | 99/353 |
| 5,410,952 A | * | 5/1995 | Liou | 99/450.6 |
| 5,460,506 A | * | 10/1995 | Price et al. | 99/353 |
| 5,486,100 A | * | 1/1996 | Hsu | 425/190 |
| 6,003,437 A | | 12/1999 | Lu | 99/450 |

FOREIGN PATENT DOCUMENTS

| | | |
|---|---|---|
| DE | 87 03 777 | 9/1987 |
| FR | 392142 | 12/1932 |

\* cited by examiner

Primary Examiner—Timothy F. Simone
(74) Attorney, Agent, or Firm—Keil & Weinkauf

(57) ABSTRACT

The machine comprises a pair of risers and a head comprising a plurality of operating roller units with rollers supported on the top and between the risers. According to the invention, the machine comprises a cover pivotally mounted by a pin with respect to the risers and over the head so to at least cover the gap on the top and on the front between the risers, in which the operating units are arranged in its closed position. Cams are functionally associated to the cover and cam trackers are functionally associated to a micro switch. The micro switch is electrically connected to the electrical power circuit of an electrical geared motor of the machine so that the micro switch electrically closes the electrical circuit only when the cover is correctly and completely closed and consequently the electrical geared motor of the machine can be turned along with the operating unit rollers only in this condition.

10 Claims, 12 Drawing Sheets

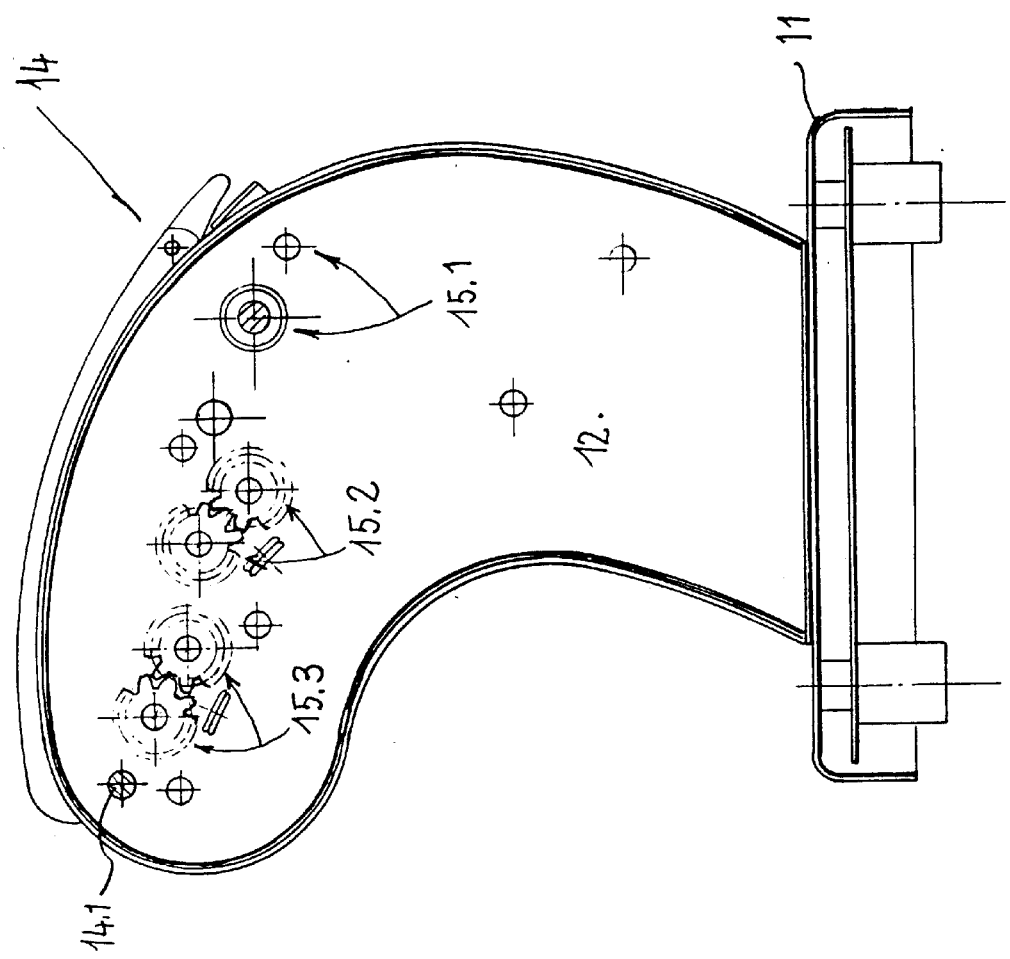

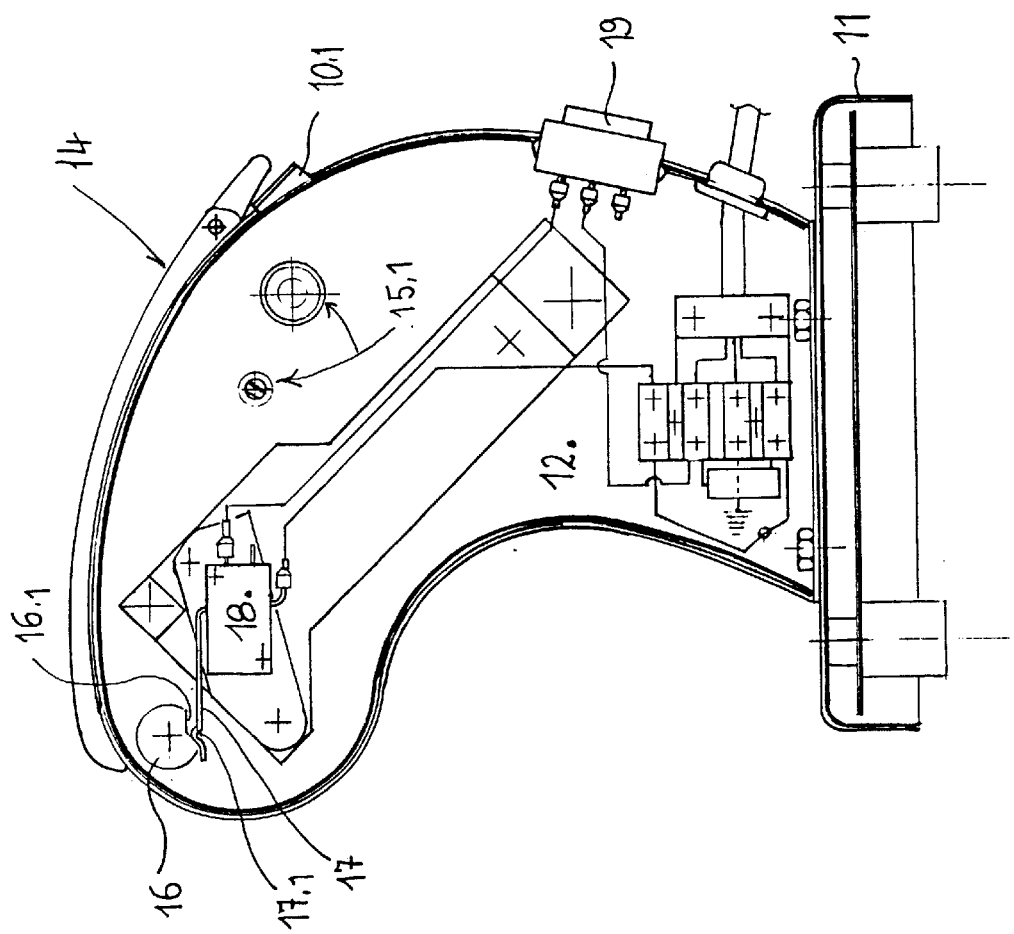

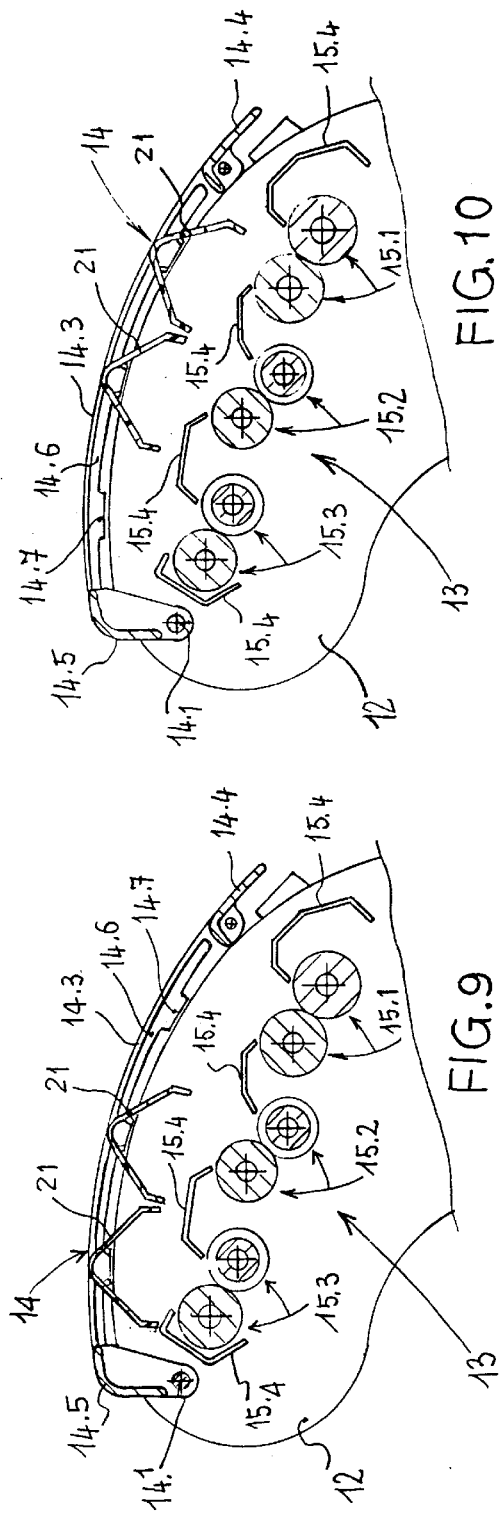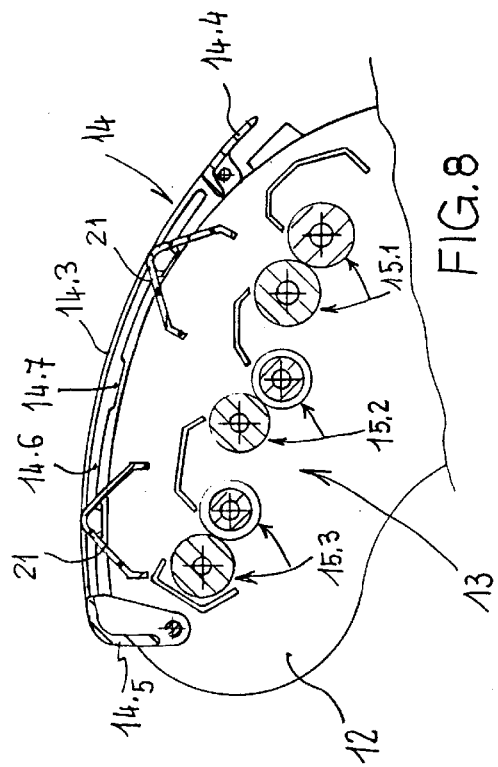

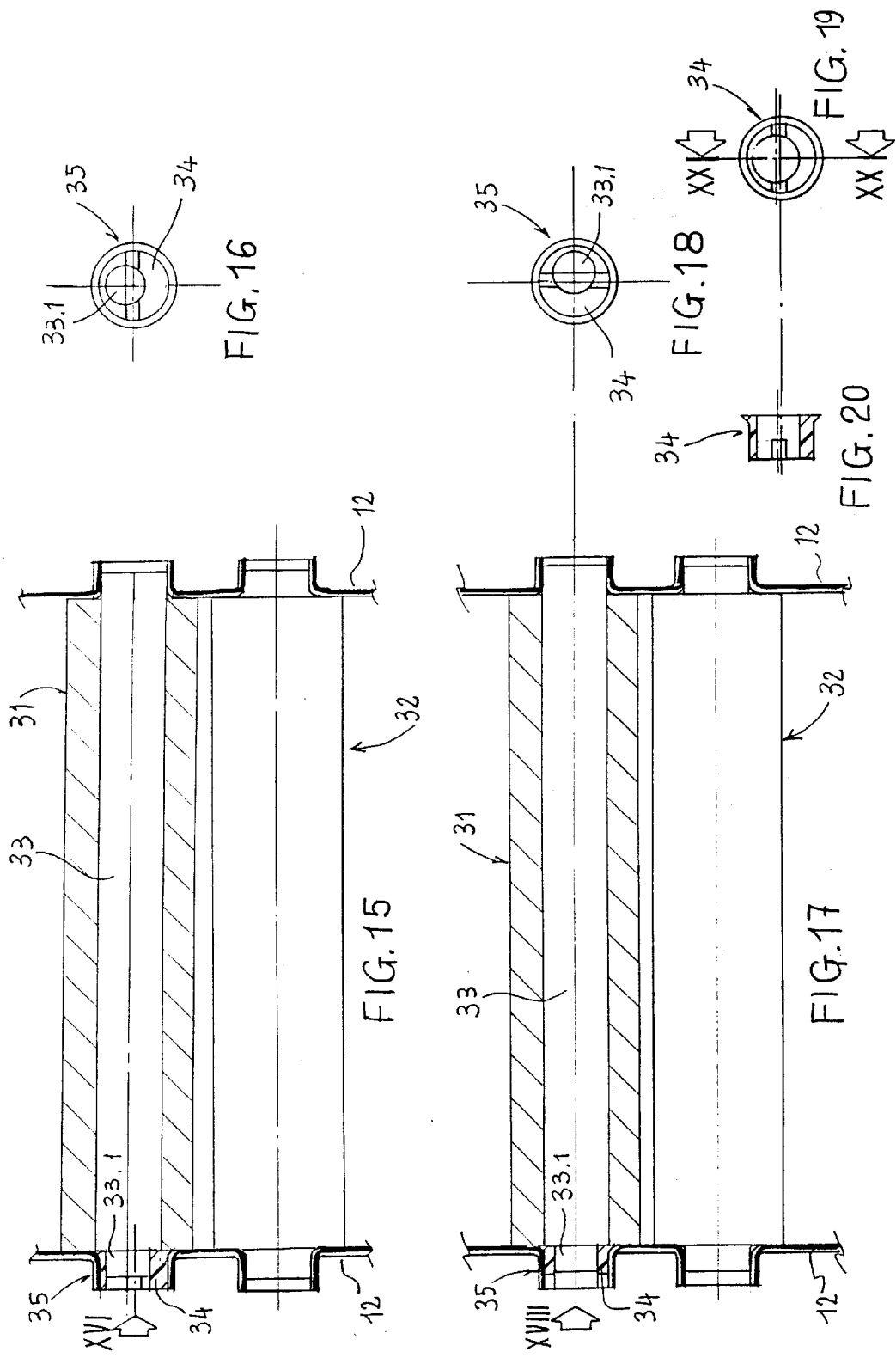

DOMESTIC MACHINE FOR MAKING, CUTTING AND SHAPING PASTA

The invention relates to a domestic machine for making, cutting and shaping pasta. Specifically, the invention concerns a machine of the specified type controlled by an electrical geared motor.

The machines of the type specified above require a unit for rolling of the sheets of pasta in which two smooth rollers are fitted adjacently and turningly on respective axis, which are essentially horizontal and parallel in a frame, which is, for example, arranged on a table or the like. The rollers are turned at the same time in opposite directions by means of a motor and respective movement transmission mechanism. Pasta mixture made of flour and eggs is manually fed and passed through the rollers and is thus flattened and rolled in the form of a sheet. Furthermore, another unit of the machine is arranged by the side of the rolling unit and is used for the subsequent cutting and/or shaping operations of the pasta from the sheet, which is manually fed and passed between another pair of rollers, whose surface is contoured, supported in the frame, respectively adjacent and turning on respective axes, which are essentially horizontal and parallel and turned at the same time in opposite directions by means of a motor.

In machines of the known type, at least two cutting and/or shaping roller units are provided and arranged by the side of the shaping unit in the frame of the machine.

However, machines of this type are not equipped with efficient means for protecting the operating units from the risk of involuntary introduction of objects or body parts of the user in the units.

Particularly, in the case in which all the pairs of rollers of said units are turningly driven at the same time, there is a severe risk of injury for the user, because the user's finger, clothes or hair can be casually caught between the rollers which are turning but which are not working the pasta mixture or the sheet of pasta.

On the other hand, machines of the specified type are not equipped with means for adjusting the parallelism between the axes of the pairs of rollers in each operating unit, specifically of the rolling unit, when the machine is being calibrated. This often causes the making of sheets of pasta whose thickness is not uniform, with consequent poor quality of the finished pasta.

The invention intends to solve these shortcomings.

Consequently, the main object of the invention is to provide a domestic machine for making, cutting and shaping pasta in which only one roller operating unit selected by the user turns and is accessible at a time and in which the roller operating units, which are not in use during operation, are safely protected against the risk of involuntary introduction of objects or body parts of the user.

Another object of the invention is to provide a domestic machine for making, cutting and shaping pasta in which the precision of the correct parallelism of the roller axes of at least one operating unit, for example the rolling unit, can be adjusted during machine calibration.

In view of obtaining these objects, the invention relates to a domestic machine for making, cutting and shaping pasta, having the characteristics specifically recited in annexed claim 1.

Additional characteristics and advantages of the invention are described in the annexed claims. Said claims are integrally annexed.

The invention will now be described, by the way of example only, with reference to the accompanying drawings wherein:

FIGS. 6 and 7 are sectional views according to the lines VI—VI and VII—VII in FIG. 2, respectively;

FIG. 8 is a sectional view of the line VIII—VIII in FIG. 2 showing two mobile guards of the protective cover in an operative position;

FIGS. 9 and 10 are similar views with respect to FIG. 8 in which said mobile guards are respectively arranged in other two operative conditions;

Figure 1:
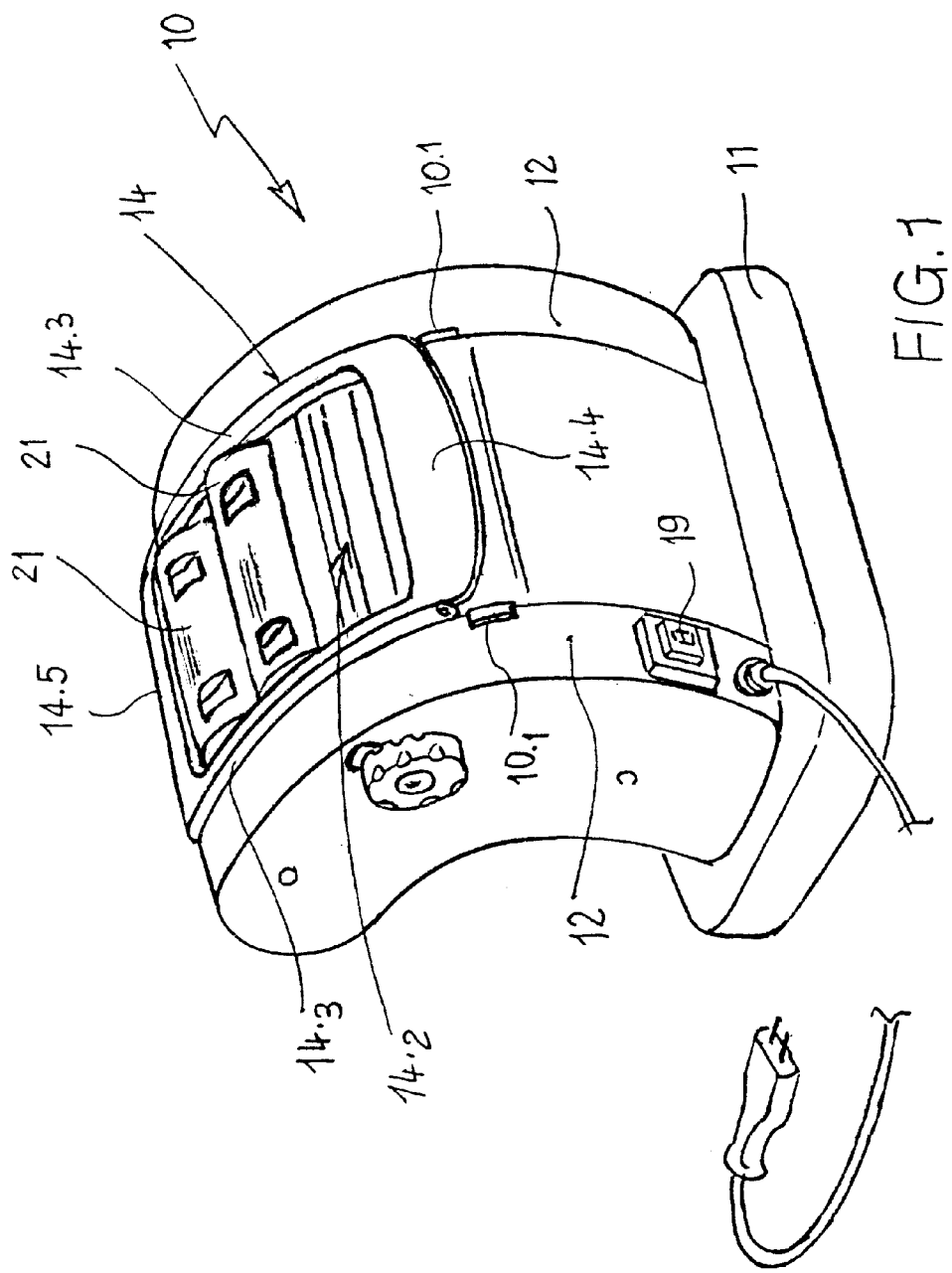
FIG. 1 is a perspective, schematic view of the domestic machine for making, cutting and shaping pasta with a safety cover in the closed position according to the invention.
Figure 13:
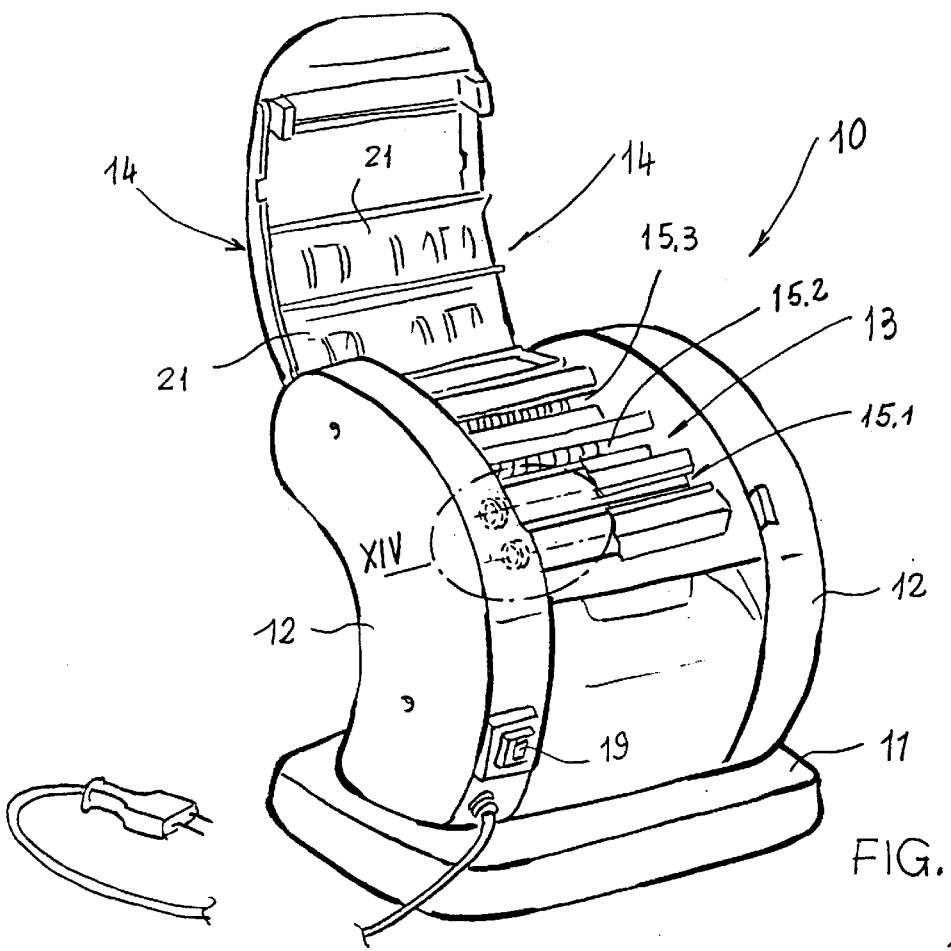
Figure 14:
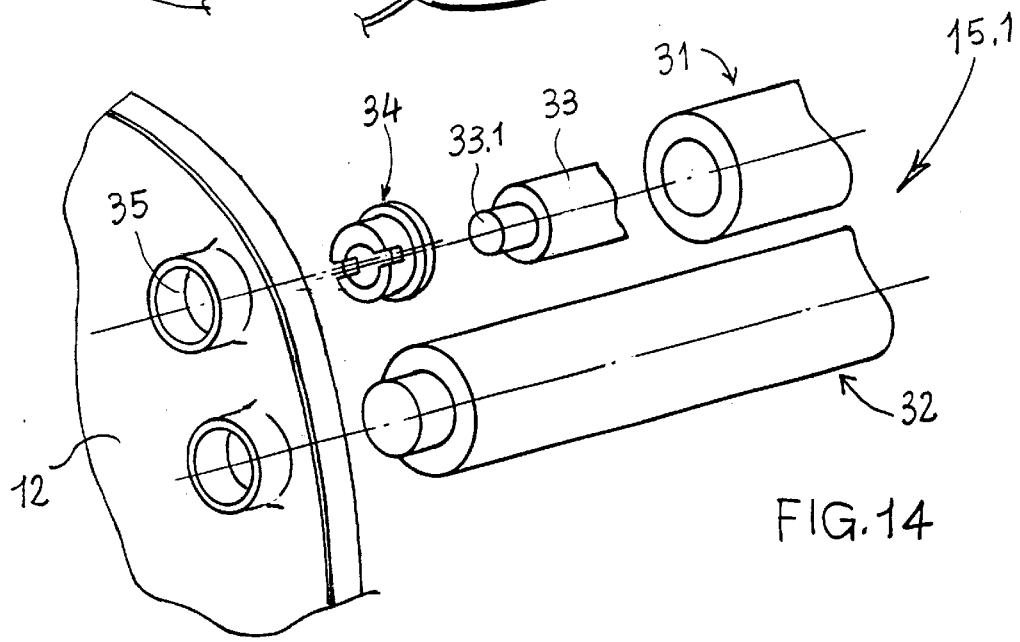

FIG. 13 is a perspective frontal view and a three-quarters view of the machine in FIG. 1 with the cover partially raised, FIG. 14 is a schematic detailed view (partial and exploded) on a larger scale of detail XIV in FIG. 13, FIGS. 15 and 17 are schematic views, in axial section and on a different scale, illustrating the two rollers of the rolling unit of the machine in FIG. 13, FIGS. 16 and 18 are views in the direction of arrow XVI in FIG. 15 and of arrow XVIII in FIG. 17, respectively, FIG. 19 is identical to FIG. 16 indicating the line XX—XX of the section generating FIG. 20.

FIG. 20 illustrates the operating units of the machine in greater detail.

With reference to drawings, numeral 10 indicates in general a domestic machine for making, cutting and shaping pasta according to the invention.

Said machine 10 comprises a machine body with a pedestal 11, a pair of boxed risers 12, which are reciprocally distanced on said base, a head 13 (FIGS. 3, 8 to 10), comprising three roller operating units supported between the risers on their top.

According to the invention, a cover 14 shaped as a frame, is pivotally mounted on a pin 14.1, which is fixed to the cover (FIGS. 8 to 10), on an axis which is essentially horizontal with respect to said risers 12 and over said head 13, so to cover the gap on the top and on the front between the risers 12 in which said three operating units are arranged.

In FIG. 8, the three roller operating units are respectively indicated with numerals 15.1 (unit comprising two rollers for rolling the pasta), 15.2 (unit comprising two rollers for cutting the sheet of pasta in wide sections) and 15.3 (unit comprising two rollers for cutting the sheet of pasta in narrow sections).

In each operating unit 15.1, 15.2, 15.3, the two rollers, with either a smooth surface (15.1) or a contoured surface 15.2, 15.3), are mounted adjacently and turningly on respective axes, which are essentially horizontal and parallel with respect to the risers 12 of the machine. The three units 15.1, 15.2, 15.3 are arranged reciprocally side by side and the respective rollers are partially covered by the guards 15.4 and reciprocally distanced to form an equal number of mouths for introducing the pasta mixture or sheet of pasta between the respective coupled rollers of each unit.

A cam 16 (FIG. 7), whose body is essentially cylindrical, and coaxially fitted on one end of the pin 14.1. It presents a groove 16.1 along its profile and cooperates with a flexible blade cam tracker 11 associated to the mobile contact of a micro switch 18, electrically connected to an electrical power circuit of an electrical geared motor (not shown) of the machine 10. Said cam tracker 17 presents a projection 17.1, elastically held in contact with the profile of the cam 16, which mates the groove 16.1 in a rotary position of the cam, in which the pin 14.1 is turned when the cover 14 is completely and correctly closed (FIG. 7). Only in this condition, the micro switch 18 electrically closes said electrical power circuit, which is also connected to a electrical control switch 19. The electrical geared motor of the machine 10 only turns, along with the rollers of the operating units 15.1, 15.2, 15.3, when said switch 19 is electrically inserted and the cover 14 is correctly and completely closed (FIG. 7).

Figure 2:
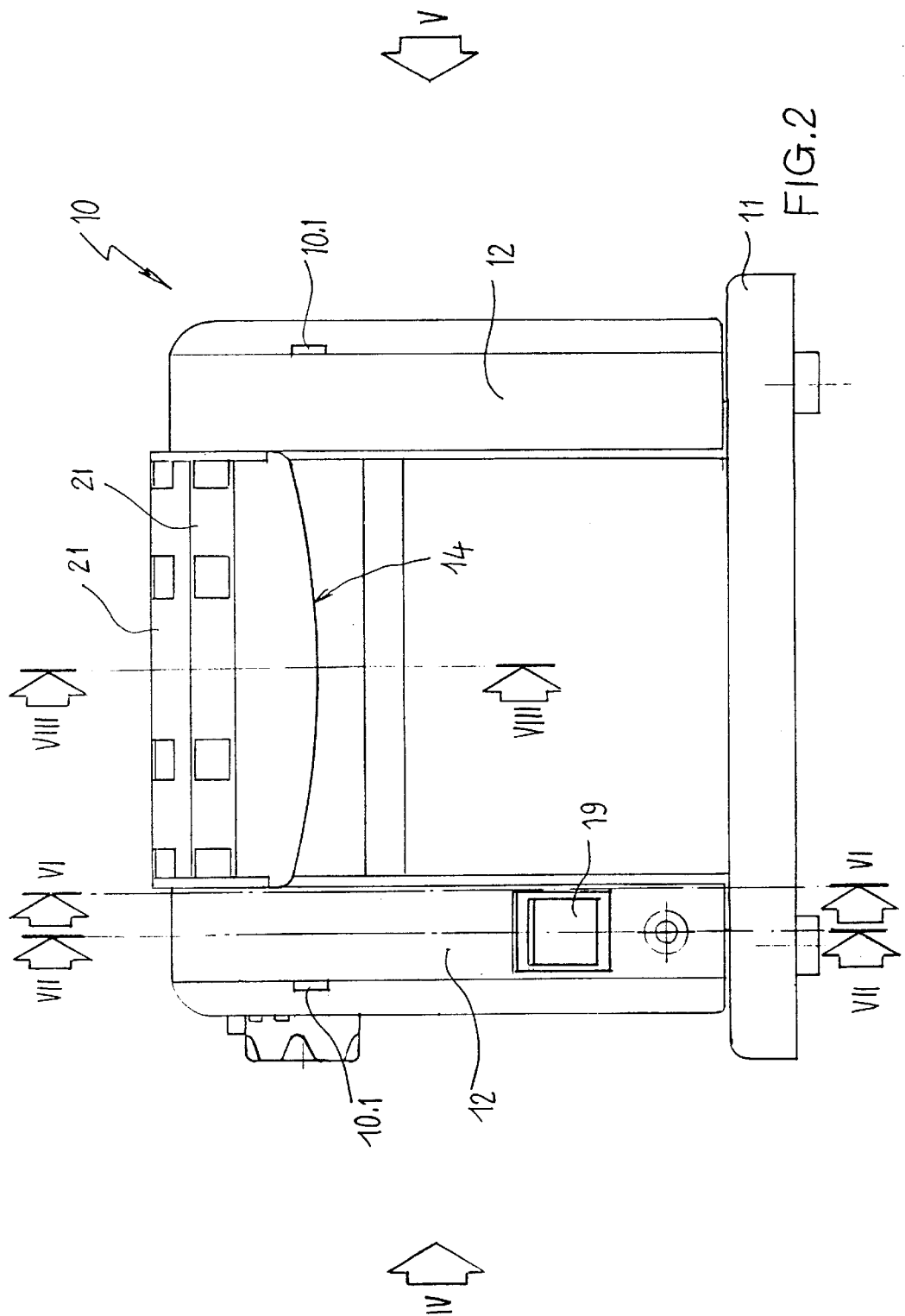
FIG. 2 is a frontal elevated view of said machine in the direction of the arrow II in FIG. 4.
Figure 3:
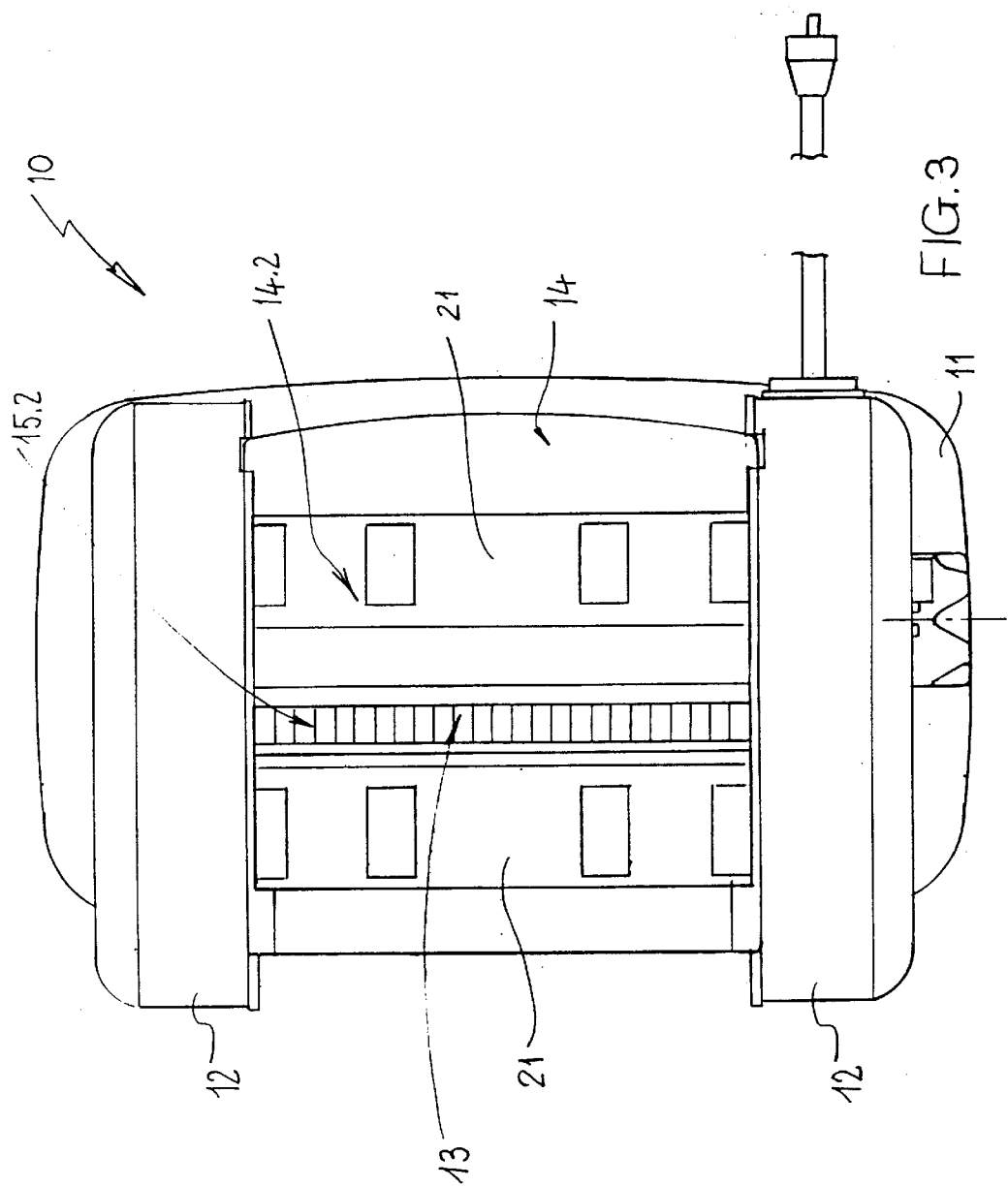
FIG. 3 is a top plan view of said machine in the direction of the arrow III in FIG. 4.
Figure 4:
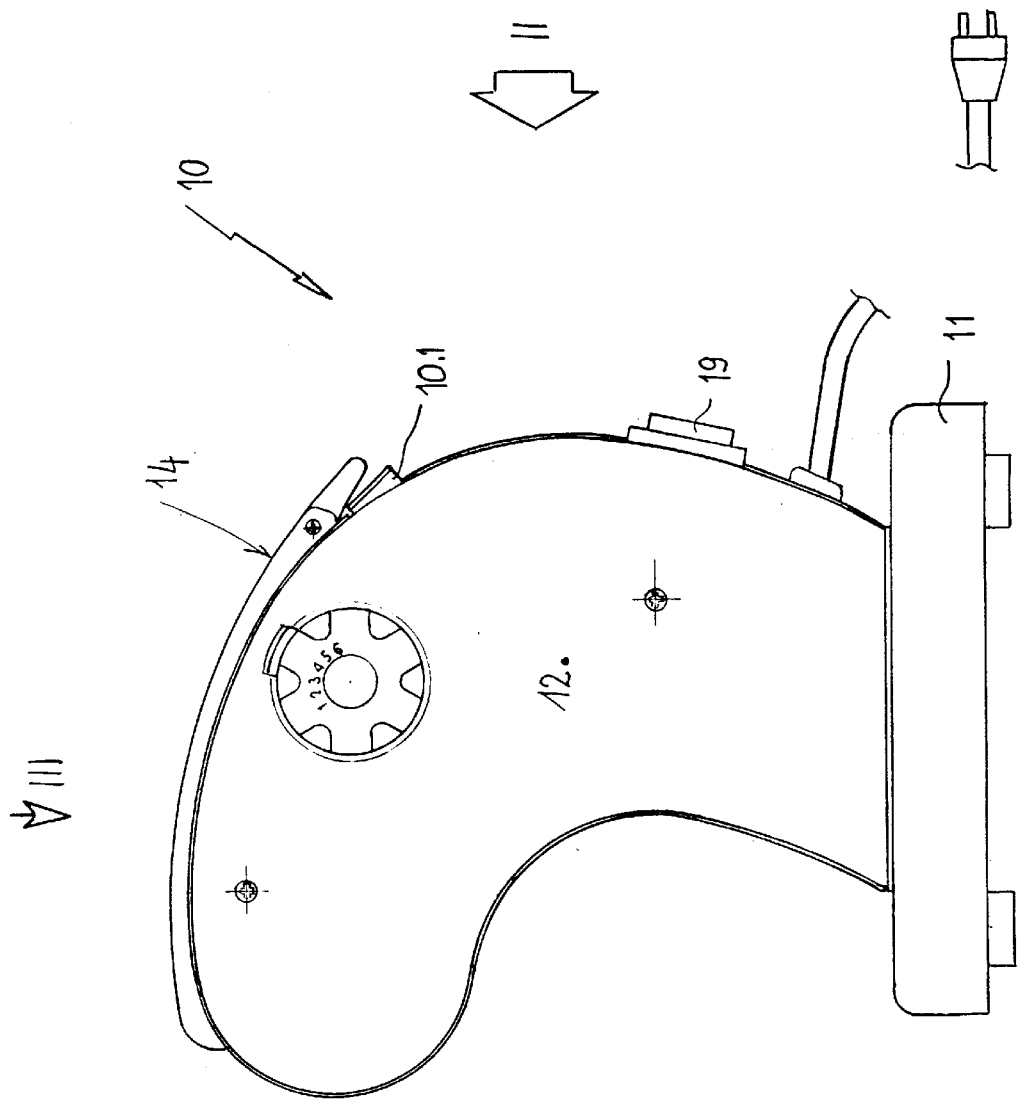
FIGS. 4 and 5 are lateral elevated views in the direction of the arrows IV and V in FIG. 2, respectively.
Figure 5:
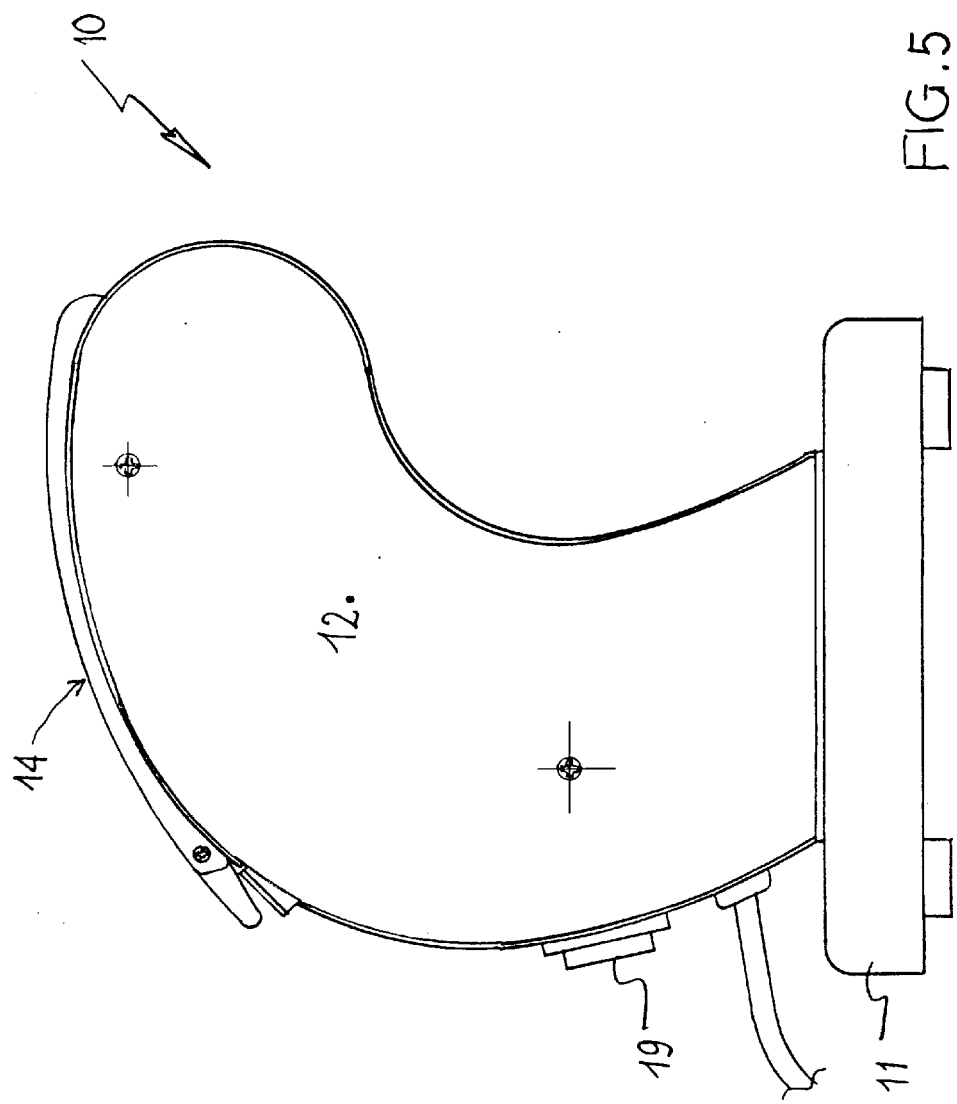
Figure 11:
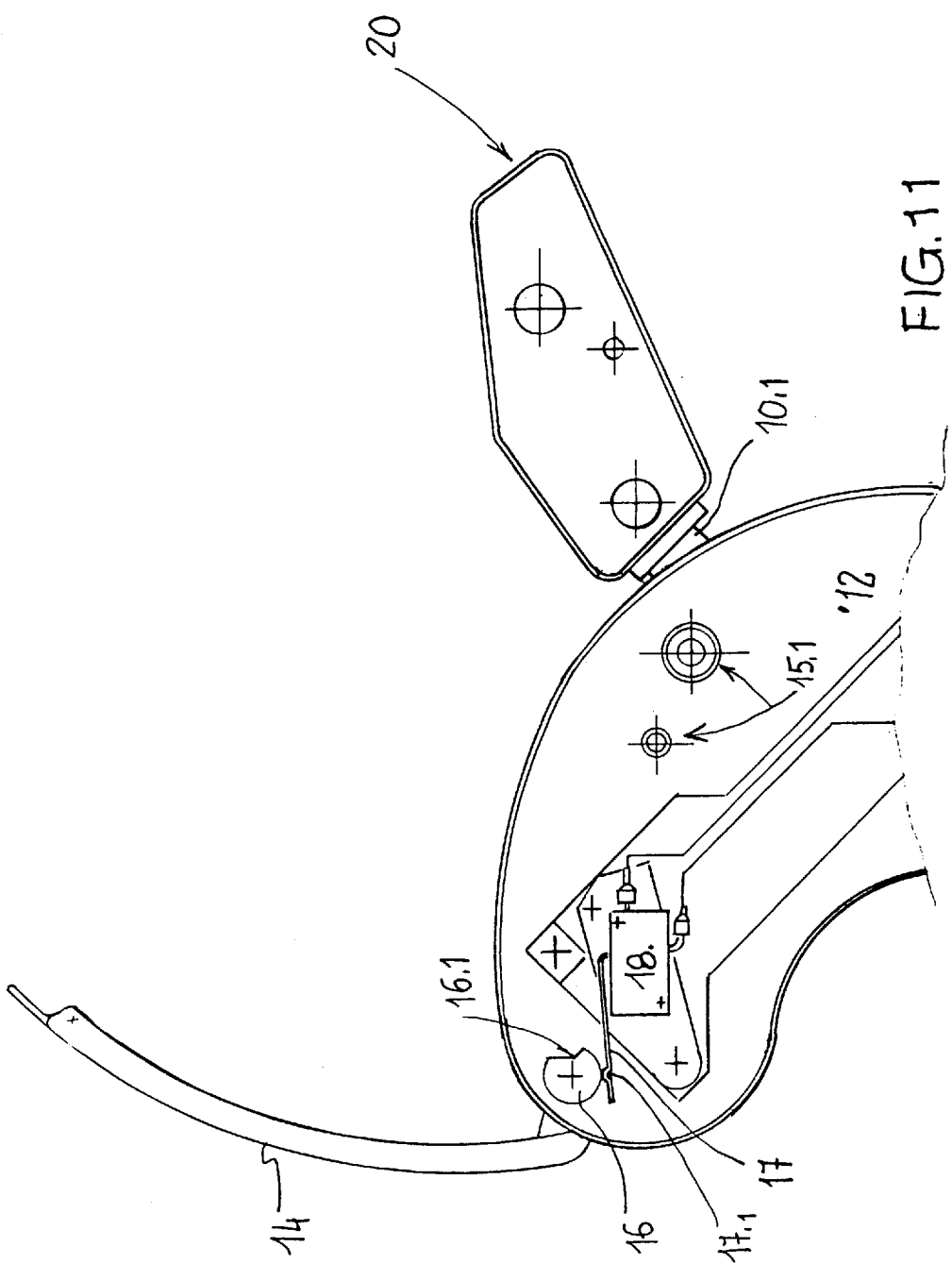
FIGS. 11 and 12 are similar views with respect to FIG. 7 illustrating only a part of the machine according to the invention which is equipped with a removable operating unit and illustrated with the cover totally open and partially closed resting on said removable operating unit respectively.
Figure 12:
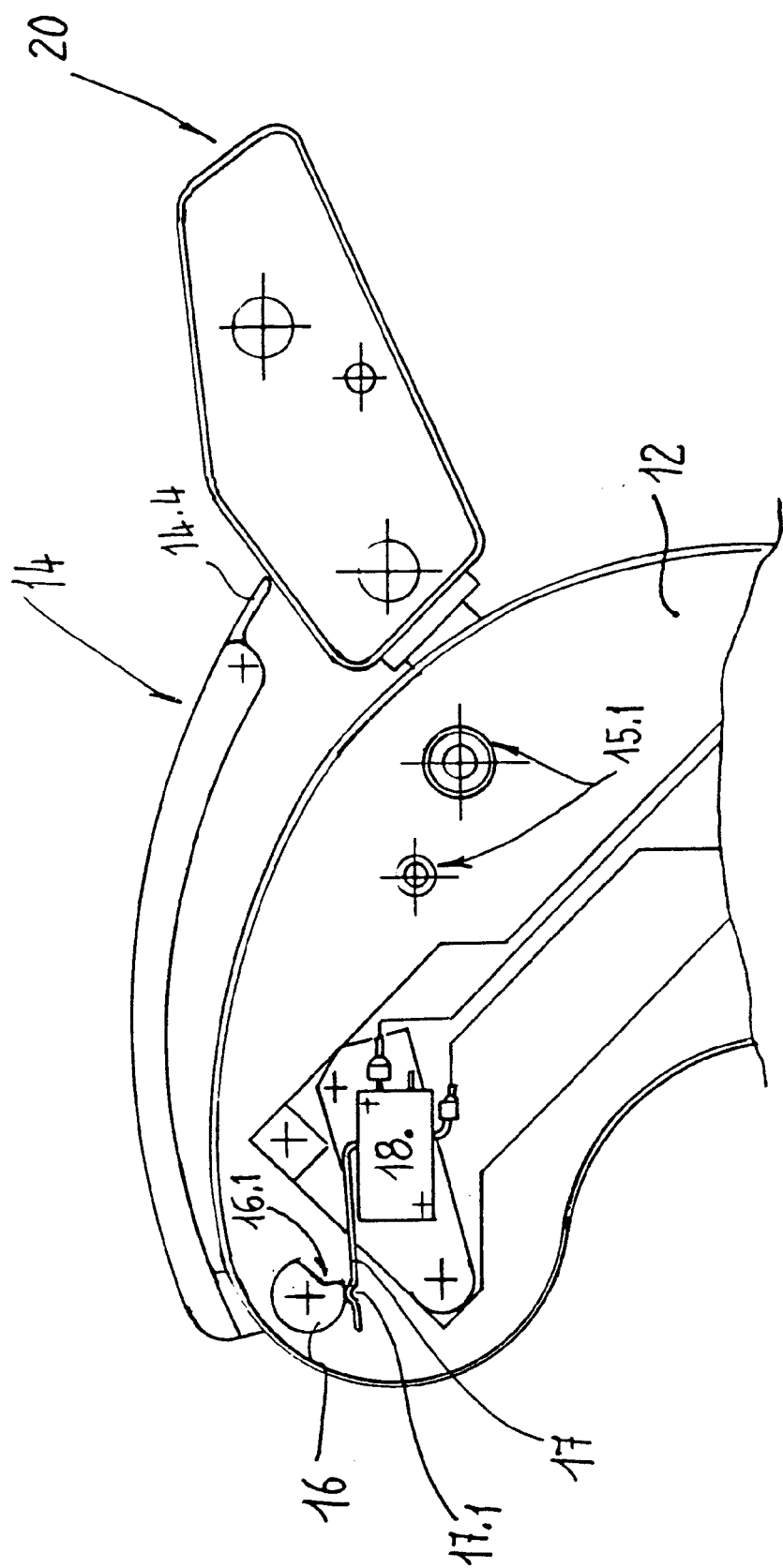

Attention is drawn to the fact that the machine 10 is equipped with frontal attachments 10.1 (FIG. 2) for removably connecting a removable operating unit 20 (as shown in FIGS. 11 and 12), with additional pairs of rollers for making a sheet of pasta. The coupled rollers of unit 20 are rotated manually (consequently independently from the geared motor of the machine 10), by means of a removable handwheel (not shown). When the operating unit 20 is fitted on the machine body by means of the attachments 10.1, the cover 14 cannot be pivoted in the completely closed position (FIG. 12). In this condition, the projection 17.1 of the cam tracker 17 does not engage the groove 16.1 of the cam 16 and the mobile contact of the micro switch 18 keeps electrically opened the electrical power circuit of the motor of the machine 10. The electrical geared motor does not turn and neither do the rollers of the operating units 15.1, 15.2, 15.3. The frame-shaped cover 14 presents a wide opening 14.2 which corresponds to said operating units 15.1, 15.2, 15.3 when the cover is closed on the head 13. Said cover 14 presents sidebars 14.3, a wide frontal crossbar 14.4 and a back bar 14.5 (FIG. 1). The inner sides of the said sidebars 14.3 present respective longitudinal grooves 14.6 along which three lowered recesses 14.7 are provided (see FIGS. 8, 9 and 10).

A pair of mobile guards 21 is provided in the cover 14. The pair of guards slides along said longitudinal grooves 14.6 in the sidebars 14.3. Each guard 21 is shaped in the form of a bell-shaped profile and is equipped with end tabs (extended in the longitudinal direction), which slidingly engage said grooves 14.6 in the sidebars 14.3. Each guard 21 is mobile between two alternative sliding positions along said sidebars 14.3 (considering the relative position of the other guard) in which the end tabs occupy a pair of opposite recesses 14.7, thus making the guard stabile in a corresponding working position. In each of its two working positions, each guard 21 completely covers a respective operating unit 15.1, 15.2 or 15.3 when the cover 14 is correctly closed on the head 13 of the machine 10.

By means of said arrangement of the two guards 21 in the cover 14, two of said operating units 15.1, 15.2, 15.3 of the machine 10 are always inaccessible when the cover 14 is correctly closed.

FIGS. 8, 9 and 10 illustrate the condition in which either the unit 15.2, or the unit 15.1, or the unit 15.3 is accessible for the user of the machine 10, respectively.

As appears in the description that follows, the rollers of the operating units 15.1, 15.2, 15.3 are made to turn following the electrical closure also of the micro switch 18 only when the electrical switch 19 is electrically inserted and the cover 14 is correctly and completely closed. In this condition, only one of said operating units 15.1, 15.2, 15.3 is accessible to the user due to the presence of two protective guards 21 which cover the other two units. The user can move said two guards 21 along the sidebars 14.3 of the cover 14 by a simple manual operation to access the operating unit which is required at that time.

FIGS. 13 to 20 schematically illustrate the operating units 15.1 of the machine 10 in greater detail for making the sheet of pasta.

Said unit 15.1 comprises two rollers with a smooth surface 31 and 32 supported between the risers 12 and which are adjacent and pivoting on respective axes, which are substantially horizontal and parallel.

The roller 31 is essentially hollow and fitted so to freely turn on a coaxial shaft 33, which is supported between said risers 12 by means of an offset assembly bushing 34 (FIGS. 19, 20) fixedly fastened on an axial end 33.1 of the shaft. Said offset bushing 34 is housed in a corresponding seat 35 provided in a riser 12 and can rotate with respect to the seat. Said bushing 34 presents a slot for a screwdriver.

This arrangement permits the recovery and correction of errors of parallelism between the axis of the two rollers 31, 32 during assembly of the machine 10 (during calibration) by turning said offset bushing 34 by a few degrees in its seat 35 whereby turning the shaft 33 around its axis.

FIGS. 15, 16 and 17, 18 illustrate said offset bushing 34 rotated in two different operative arrangements at 90° one with respect to the other.

What is claimed is:

1. Domestic machine for making, cutting and shaping pasta, comprising a base (11), a pair of risers (12) reciprocally distanced on said base, a head (13) including a plurality of operating roller units (15.1, 15.2, 15.3) with rollers supported on the top and between said risers, and also comprising electrical geared motor means which turn the rollers of the operating units and are electrically connected to an electrical power circuit of said machine, characterized in that it comprises a cover (14) pivotally mounted by means of a pin (14.1) with respect to said risers (12) and over said head (13) so to cover at least the gap on the top and on the front between the risers (12) in which said operating units are arranged.

2. Machine according to claim 1, characterized in that it comprises cam means (16, 16.1) functionally associated to said cover (14) and cam tracker means (17, 17.1) functionally associated to a micro switch (18) electrically connected to the electrical power circuit of the geared motor means of 'the machine, so that said micro switch (18) electrically closes said electrical circuit which is also electrically connected to an electrical control switch (19) only when said cover (14) is correctly and completely closed and said switch (19) is electrically connected and consequently the electrical micro switch of the machine (10) can turn along with the rollers of the operating units (15.1, 15.2, 15.3) only in this condition.

3. Machine according to claim 1, characterized in that said cover (14) is essentially shaped as a frame.

4. Machine according to claim 3, characterized in that said cover (14) is shaped as a frame and presents a wide opening (14.2) which, when the cover is closed on the head (13), corresponds to said operating units (15.1, 15.2, 15.3).

5. Machine according to claim 1, comprising at least two roller operating units (15.1, 15.2, 15.3), characterized in that said frame cover (14) is equipped with at least one mobile guard (21) which, when the cover is correctly closed, is selectively arranged to protect a respective roller operating unit to prevent the involuntary introduction of objects or parts of the user's body in the unit.

6. Machine according to claim 5 comprising three operating units (15.1, 15.2, 15.3) characterized in that said frame cover (14) is provided with a pair of mobile guards (21).

7. Machine according to claim 5 characterized in that said frame cover (14) comprises sidebars (14.3) whose internal sides present respective longitudinal grooves (14.6) along which recesses (14.7) are provided, and in that each guard (21) is provided with end tabs which slidingly engage said grooves (14.6) of the sidebars (14.3) and, in the working position of the guard (21), are arranged in two of said opposite grooves (14.7).

8. Machine according to claim 6, characterized in that each guard (21) is mobile between two alternative sliding positions along said grooves (14.6) in the sidebars (14.3) (considering the respective position of the other guard), in which the end tabs occupy a pair of opposite recesses (14.7) whereby making it stabile in a corresponding working position, and in that in each of the two working positions, each guard (21) completely covers a respective operating unit (15.1, 15.2, 15.3) when the cover (14) is correctly closed on the head (13) of the machine (10) so that two of said operating units (15.1, 15.2, 15.3) of the machine (10) are always inaccessible when the cover (14) is completely and correctly closed.

9. Machine according to claim 1, characterized in that at least one (31) of the two rollers of at least one operating unit (15.1) comprises means (33, 33.1, 34, 35) for correcting errors of parallelism between the axes of the rollers during machine assembly (by means of an adjustment operation).

10. Machine according to claim 9, characterized in that one roller (31) of said unit (15.1) is axially hollow and fitted so to freely turn on a coaxial shaft (33) which is supported between said risers (12) by means of an offset assembly bushing (34) fixedly fastened on an axial end (33.1) of the shaft, and in that said offset bushing (34) is housed in a corresponding seat (35) provided in a riser (12) and can turn with respect to the seat.

* * * * *

UNITED STATES PATENT AND TRADEMARK OFFICE
CERTIFICATE OF CORRECTION

PATENT NO. : 6,698,338 B2  Page 1 of 1
DATED : March 2, 2004
INVENTOR(S) : Ancona et al.

It is certified that error appears in the above-identified patent and that said Letters Patent is hereby corrected as shown below:

<u>Title page,</u>
Item [30], Foreign Application Priority Data, "TO20000U0221" should be
-- TO2000U000221 --.

Signed and Sealed this

First Day of June, 2004

JON W. DUDAS
*Acting Director of the United States Patent and Trademark Office*